Oct. 30, 1928.
R. S. SANFORD
1,689,255
VEHICLE BRAKE MECHANISM
Filed Feb. 28, 1927
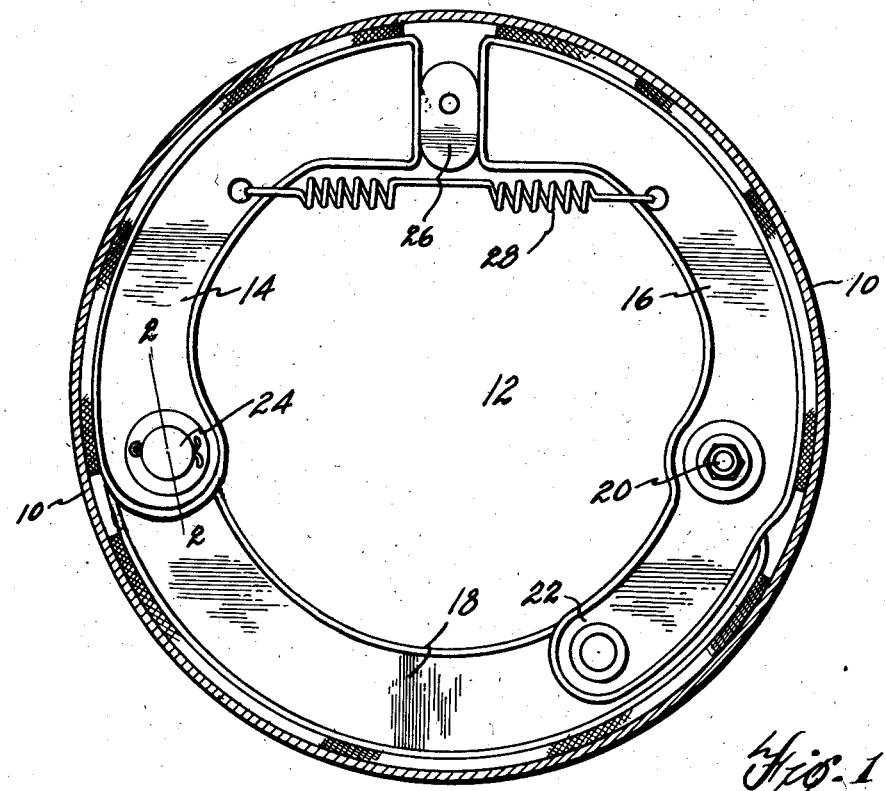
Fig. 1
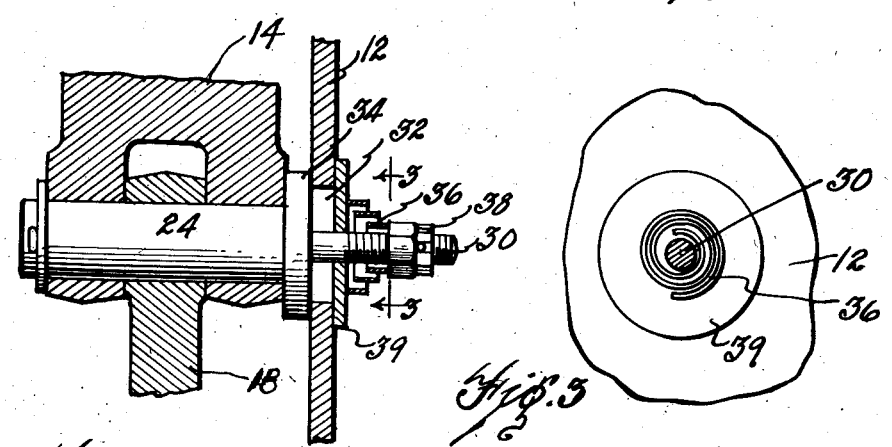
Fig. 2
Fig. 3
INVENTOR
Roy S. Sanford
BY
Burton & McConkey
ATTORNEYS.

Patented Oct. 30, 1928.

1,689,255

UNITED STATES PATENT OFFICE.

ROY S. SANFORD, OF SOUTH BEND, INDIANA, ASSIGNOR TO BENDIX BRAKE COMPANY, OF CHICAGO, ILLINOIS, A CORPORATION OF ILLINOIS.

VEHICLE BRAKE MECHANISM.

Application filed February 28, 1927. Serial No. 171,503.

My invention relates to improvements in brake mechanism particularly to brake mechanism intended for use in motor driven road vehicle construction such as employs multiple shoe internal brakes.

An object is to provide improved positioning means for a floating pivotal connection between two of the shoes. A further object is to provide improved positioning means cooperating with the backing plate to automatically assist in the positioning of such floating pivotal connection and readily adjustable from the opposite or outer side of the backing plate.

Meritorious features reside in the employment of easily adjustable positioning mechanism associated with a floating pivotal connection between two of the brake shoes mounted within the drum upon one side of the backing plate, which mechanism is adapted to automatically position such floating connection with respect to the backing plate and to maintain the same at any point to which it may have been moved during its floating movement but which is yieldable to permit relocation of such floating connection in response to the wiping action of the brake drum over the shoes.

Other advantages, objects, and worthwhile features of my invention will more fully appear from the following specification, appended claims and accompanying drawing, wherein:

Fig. 1 is a vertical sectional view through brake mechanism embodying my invention.

Fig. 2 is a cross sectional view taken on line 2—2 of Fig. 1.

Fig. 3 is a cross sectional view taken on line 3—3 of Fig. 2.

I have shown my invention embodied in a brake structure of a well known type wherein 10 indicates the rotatable brake drum; 12, the stationary backing plate; and 14, 16 and 18 the articulated brake shoes being the primary, auxiliary and secondary shoes respectively as known in the trade. These brake shoes are pivotally anchored to the backing plate at 20. The auxiliary and secondary shoes are pivotally connected at 22 and the primary shoe is connected to the secondary shoe by a floating pivotal connection 24. The invention resides in this floating pivotal connection and means for positioning the same in combination with the remaining brake mechanism. The shoes are actuated by a cam 26 and a spring 28 connects the primary and auxiliary shoes to draw them away from the brake drum.

The pivotal connection 24 is provided with a reduced axial extension 30 which extends through the backing plate through an opening 32, which opening is sufficiently oversize the portion 30 of the pivot pin to permit floating movement of such pin as accounted for by the travel of the brake shoes. The pivot pin is provided with a radial flange 34 which frictionally engages the backing plate surrounding the opening 32. A spiral spring 36 encircles the outwardly projecting portion 30 of the pivot pin and is held under adjustable tension between a nut 38 and a washer 39 to maintain the part 34 in frictional engagement with the backing plate 12 so as to position the pivot pin with respect to the backing plate.

When the brakes are applied and actuated with respect to the drum, there is a limited floating movement of the pin within the opening 32. The action of the spring in maintaining the frictional engagement between the part 34 and the backing plate serves to hold the pivot pin at the position to which it is moved but the wiping action of the drum over the brake shoes serves to return the pivot pin to a normally central position where it is held by the frictional engagement heretofore referred to. It is to be remembered that the clearance between the brake shoes and drum and the actual movement of the brake shoes is very slight and that in commercial practice all brake drums are slightly out of round and due to this out of round condition a wiping action of the drum over the shoes results which produces effect hereinabove set forth.

What I claim is:

1. In brake mechanism, a drum, a backing plate provided with an opening, shoes mounted upon the plate within the drum including a pair of shoes provided with a pivotal connection extending through the opening in the backing plate, said connection being of such size as to have a permitted floating movement within said opening, and means engaging said connection on the opposite side of the backing plate to releasably hold the connection at any position to which it has been moved with respect to said plate.

2. In brake mechanism, a drum, a backing plate provided with an opening, shoes mounted upon the plate within the drum including a pair of shoes provided with a pivotal connection extending through the opening in the backing plate, said connection being of such size as to have a permitted floating movement within said opening and adjustable spring means engaging said connection on the opposite side of the backing plate to releasably hold the connection at any position to which it has been moved with respect to said plate.

3. In brake mechanism, a drum, a backing plate provided with an opening, shoes mounted upon the plate within the drum including a pair of shoes provided with a pivotal connection extending through the opening in the backing plate, said connection being of such size as to have a permitted floating movement within said opening and means holding said connection in frictional engagement with the backing plate to releasably position the same at any point at which it may be moved with respect to said plate.

4. In brake mechanism, a backing plate, brake shoes associated with said plate and provided with a floating pivotal connection and positioning means adapted to automatically releasably hold said connection at any position to which it may have been moved with respect to said backing plate.

5. In brake mechanism, a backing plate, brake shoes associated with said plate and provided with a floating pivotal connection and positioning means holding said connection in frictional engagement with the backing plate to releasably retain the connection at any position to which it may have been moved with respect to said plate.

6. In brake mechanism, a backing plate provided with an opening therethrough, brake shoes on one side of the plate provided with a pivotal connection extending through the opening in the plate for floating movement therein, positioning means engaging said connection on the opposite side of the plate to restrain the floating movement thereof.

7. In brake mechanism, a backing plate provided with an opening therethrough, brake shoes on one side of the plate provided with a pivotal connection extending through the opening in the plate for floating movement therein, positioning means engaging said connection on the opposite side of the plate adapted to releasably hold said connection at any position to which it may have been moved by such floating movement.

8. In brake mecahnism, a drum, a backing plate, shoes within the drum on one side of the backing plate, said shoes provided with a floating pivotal connection extending through the backing plate, said backing plate provided with an opening about said connection of sufficient size to permit floating movement thereof within the opening, positioning means to maintain said connection in frictional engagement with the plate to hold the same at any position to which it may have been moved during its floating movement adapted to permit relocation thereof in response to the wiping of the drum over the shoes.

9. In brake mechanism, a drum, a backing plate, articulated brake shoes pivotally mounted upon the plate within the drum, two of said shoes provided with a floating pivotal connection, said connection extending through the backing plate, said backing plate provided with an opening about said connection of sufficient size to permit floating movement of the connection within the opening, positioning means maintaining said connection in frictional engagement with the backing plate adapted to permit relocation of the connection in response to the wiping action of the drum over the shoes.

10. In brake mechanism, a drum, a backing plate, a pair of articulated brake shoes pivotally anchored to the backing plate within the drum, a third shoe having a floating pivotal connection with one of said anchored shoes, said connection provided with positioning means on the opposite side of the backing plate.

11. In brake mechanism, a drum, a backing plate, a pair of articulated brake shoes pivotally anchored to the backing plate within the drum, a third shoe having a floating pivotal connection with one of said anchored shoes, said connection provided with a part extending through the backing plate and having positioning means on the opposite side of said plate.

12. In brake mechanism, a drum, a backing plate, a pair of articulated brake shoes pivotally anchored to the backing plate within the drum, a third shoe having a floating pivotal connection with one of said anchored shoes, said connection having a part extending through the backing plate and held under spring tension to releasably position the connection.

13. In brake mechanism, a drum, a backing plate, a pair of articulated brake shoes pivotally anchored to the backing plate within the drum, a third shoe having a floating pivotal connection with one of said anchored shoes, said connection having a part extending through the backing plate, said backing plate provided with an opening about said connection of sufficient size to permit floating movement thereof within the opening, said connection provided with a flange engaging the backing plate surrounding the opening therethrough, and a spring encircling the connection and exerting a tension thereon to hold said flange in frictional engagement with the backing plate.

14. In brake mechanism, a drum, a backing plate, a pair of articulated brake shoes pivotally anchored to the backing plate within the drum, a third shoe having a floating pivotal connection with one of said anchored shoes, said connection provided with positioning means holding the same in frictional engagement with the backing plate.

15. In brake mechanism, a drum, a backing plate, a pair of articulated brake shoes pivotally anchored to the backing plate within the drum, a third shoe having a floating pivotal connection with one of said anchored shoes, said connection provided with positioning means exerting a spring tension thereon holding the same in frictional engagement with the backing plate to position the same with respect thereto.

16. A brake comprising a drum and retarding means engageable with the drum, in combination with means for holding at least a portion of the retarding means in any position to which it is shifted, the eccentricities of the drum serving to shift said portion of the retarding means to a position slightly spaced from the drum when the brake is released.

17. A brake comprising a drum and retarding means engageable with the drum, in combination with means operated by the eccentricities of the drum to determine the position of the retarding means with respect to the drum when the brake is released.

18. A brake comprising a drum and retarding means engageable therewith, in combination with yielding mechanism operable to releasably hold the retarding means at any position to which it may be moved by the drum when the brake is released.

19. A brake having a drum and retarding means engageable therewith in combination with mechanism operable to automatically releasably hold the retarding means at the position to which it is wiped by the eccentricities of the drum upon release of the brake.

20. A brake having a drum, a stationary part, and retarding means engageable with the drum in combination with means having frictional engagement with the stationary part and operable to automatically hold a part at least of the retarding means at that position to which it is moved by the drum upon release of the brake.

21. A brake having a drum and retarding means engageable therewith in combination with a part exerting a constant tension on the retarding means tending to hold a portion thereof at that position to which it is moved by the drum upon release of the brake.

22. A brake having a drum, a backing plate, and retarding means engageable with the drum, in combination with a spring actuated part having frictional engagement with the backing plate and connected with the retarding means to releasably automatically hold the same at that position to which it is moved by the eccentricities of the drum upon release of the brake.

In testimony whereof, I, ROY S. SANFORD, sign this specification.

ROY S. SANFORD.